(12) United States Patent
Lee et al.

(10) Patent No.: US 12,248,623 B2
(45) Date of Patent: Mar. 11, 2025

(54) DISPLAY DEVICE AND METHOD OF DRIVING THE SAME

(71) Applicant: Samsung Display Co., Ltd., Yongin-Si (KR)

(72) Inventors: Tae Un Lee, Yongin-si (KR); Sung Hwan Park, Yongin-si (KR); Chang Ho Hyun, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/865,633

(22) Filed: Jul. 15, 2022

(65) Prior Publication Data

US 2023/0069320 A1   Mar. 2, 2023

(30) Foreign Application Priority Data

Aug. 24, 2021   (KR) .................. 10-2021-0111922

(51) Int. Cl.
*G06F 3/01* (2006.01)
*G02B 27/01* (2006.01)
(Continued)

(52) U.S. Cl.
CPC ........... *G06F 3/013* (2013.01); *G02B 27/017* (2013.01); *G09G 3/2007* (2013.01);
(Continued)

(58) Field of Classification Search
CPC .......... G06F 3/013; G06F 3/012; G06F 3/147; G02B 27/017; G02B 27/287; G02B 2027/0138; G09G 3/2007; G09G 3/32; G09G 3/3208; G09G 3/003; G09G 2310/027; G09G 2310/08; G09G 2310/0232; G09G 2330/023; G09G 2354/00; G09G 2340/0485; G09G 5/005;
(Continued)

(56) References Cited

U.S. PATENT DOCUMENTS

| 2016/0012274 | A1* | 1/2016 | Chen | ..................... G06V 20/597 |
| 2016/0133221 | A1* | 5/2016 | Peana | ...................... G09G 5/10 |
| | | | | 345/212 |
| 2016/0238845 | A1* | 8/2016 | Alexander | .............. G06F 3/011 |
| 2018/0292896 | A1* | 10/2018 | Hicks | ...................... G06F 3/013 |

(Continued)

FOREIGN PATENT DOCUMENTS

| JP | 2015-073171 A | 4/2015 |
| JP | 2019-74589 A | 5/2019 |

(Continued)

*Primary Examiner* — Christopher E Leiby
(74) *Attorney, Agent, or Firm* — Innovation Counsel LLP

(57) ABSTRACT

A display device includes: a visual sensor for generating visual sensing data by sensing an eye of a user; a display panel including a display area and pixels disposed on the display area; an image converter for generating a second image signal by converting a first image signal of the pixels based on the visual sensing data; and a data driver for providing the pixels with data signals corresponding to the second image signal. The image converter generates visual information based on the visual sensing data, determines a first area and a second area different from the first area of the display area based on the visual information, and generates the second image signal by converting grayscales of the second area in the first image signal.

19 Claims, 11 Drawing Sheets

(51) Int. Cl.
*G09G 3/20* (2006.01)
*G09G 3/32* (2016.01)
*G09G 3/3208* (2016.01)

(52) U.S. Cl.
CPC ....... *G02B 2027/0138* (2013.01); *G09G 3/32* (2013.01); *G09G 3/3208* (2013.01); *G09G 2310/027* (2013.01); *G09G 2310/08* (2013.01); *G09G 2330/023* (2013.01); *G09G 2354/00* (2013.01)

(58) Field of Classification Search
CPC .. G09G 5/003; G09G 5/10; G09G 2320/0613; G09G 2320/068; G09G 2320/08
See application file for complete search history.

(56) References Cited

U.S. PATENT DOCUMENTS

| | | | | |
|---|---|---|---|---|
| 2020/0264434 | A1* | 8/2020 | Shin | G03H 1/02 |
| 2020/0301161 | A1* | 9/2020 | Iwata | H04N 13/366 |
| 2021/0048668 | A1* | 2/2021 | Klug | G02B 27/0172 |
| 2021/0225303 | A1* | 7/2021 | Shi | G09G 3/3406 |
| 2021/0382325 | A1* | 12/2021 | Kubota | G02C 7/06 |
| 2022/0207664 | A1* | 6/2022 | Lin | G06T 7/001 |
| 2023/0029822 | A1* | 2/2023 | Ogawa | G09G 5/10 |

FOREIGN PATENT DOCUMENTS

| | | |
|---|---|---|
| KR | 10-0244764 B1 | 3/2000 |
| KR | 10-2014-0137949 A | 12/2014 |
| KR | 10-2021-0062962 A | 6/2021 |
| KR | 10-2270577 B1 | 6/2021 |

\* cited by examiner

DISPLAY DEVICE AND METHOD OF DRIVING THE SAME

CROSS-REFERENCE TO RELATED APPLICATION

The present application claims priority under 35 U.S.C. § 119(a) to Korean patent application 10-2021-0111922 filed on Aug. 24, 2021, in the Korean Intellectual Property Office, the entire disclosure of which is incorporated herein by reference.

BACKGROUND

1. Technical Field

The present disclosure generally relates to a display device and a method of driving the same.

2. Related Art

A display device includes a display panel and a driver. The display panel may display an image on a display area corresponding to signals provided from the driver.

Meanwhile, when a user views an image displayed on the display area, an area visually recognized (or concentrated) by the user (e.g., a viewing area or a recognition area) may be different for every user or for every viewing environment according to eyes, a viewing angle, and the like of the user. When the display device displays an image with the same luminance in a viewing area and an area except the viewing area, unnecessary power consumption may occur in the area except the viewing area.

SUMMARY

Embodiments provide a display device capable of minimizing power consumption while not deteriorating the visibility of a user.

In accordance with an aspect of the present disclosure, there is provided a display device including: a visual sensor configured to generate visual sensing data by sensing an eye of a user; a display panel including a display area and pixels disposed on the display area; an image converter configured to generate a second image signal by converting a first image signal of the pixels based on the visual sensing data; and a data driver configured to provide the pixels with data signals corresponding to the second image signal, wherein the image converter generates visual information, based on the visual sensing data, determines a first area and a second area different from the first area of the display area based on the visual information, and generates the second image signal by converting grayscales of the second area in the first image signal.

The image converter may decrease the grayscales of the second area.

The image converter may convert the grayscales of the second area into grayscale 0.

The image converter may include: a visual analyzer configured to generate first visual information corresponding to a line of a sight of the user and second visual information corresponding to a viewing angle of the user, based on the visual sensing data; a reference point extractor configured to determine a reference point corresponding to the line of the sight of the user on the display area based on the first visual information and generate reference point data corresponding to the reference point; an area extractor configured to detect a size of a visual area corresponding to the viewing angle of the user based on the second visual information and generate area data corresponding to the size of the visual area; and a viewing area determiner configured to determine the first area and the second area based on the reference point data and the area data, and generate visible area data corresponding to the first area and the second area.

The visual analyzer may generate the first visual information from a position of a pupil of the eye of the user and generate the second visual information from a size of the pupil of the eye of the user based on the visual sensing data.

The reference point extractor may determine a point at which an extension line corresponding to the line of the sight of the user and the display area meet each other as the reference point.

The area extractor may detect the size of the visual area based on a distance between the display area and a certain point at a retina of the eye of the user in which an image is focused and the viewing angle of the user.

The display device may further include a distance measuring sensor configured to measure the distance between the display area and the retina.

The distance between the display area and the retina may have a predetermined value.

The viewing area determiner may determines an area having a size equal to that of the visual area and including the reference point as a center of the area as the first area, and determines an area except the first area as the second area.

The image converter may further include a grayscale converter configure to specify pixels corresponding to the second area among the pixels based on the visible area data received from the viewing area determiner and generate the second image signal by converting grayscales of the pixels corresponding to the second area in the first image signal.

The visual sensor may generate the visual sensing data in each of a first frame and a second frame consecutive to the first frame. The image converter may generate the second image signal corresponding to the first frame based on the visual sensing data generated in the first frame and generate the second image signal corresponding to the second frame based on the visual sensing data generated in the second frame.

The visual sensor may generate the visual sensing data in a first frame. The image converter may generate the second image corresponding to the first frame and the second image corresponding to a second frame consecutive to the first frame.

The visual sensor may include a camera configured to acquire an image corresponding to the eye of the user by photographing the eye of the user.

In accordance with an aspect of the present disclosure, there is provided a method of driving a display device including a display area and pixels disposed on the display area, the method including: generating visual sensing data by sensing an eye of a user; generating visual information based on the visual sensing data; determining a first area and a second area different from the first area of the display area based on the visual information; specifying pixels corresponding to the second area among the pixels; generating a second image signal by converting grayscales of the pixels corresponding to the second area in a first image signal of the pixels; and providing the pixels with data signals corresponding to the second image signal.

In the generating of the second image signal, the grayscales of the pixels corresponding to the second area may be decreased.

In the generating of the second image signal, the grayscales of the pixels corresponding to the second area may be converted into grayscale 0.

The generating of the visual information may include: generating first visual information corresponding to a line of a sight of the user based on the visual sensing data; and generating second visual information corresponding to a viewing angle of the user based on the visual sensing data.

The determining of the first area and the second area may include: determining a reference point corresponding to the line of the sight of the user based on the first visual information; and determining a size of a visual area corresponding to the viewing angle of the user based on the second visual information.

The determining of the first area and the second area may further include: determining an area having a size equal to that of the visual area and including the reference point as a center of the area as the first area; and determining an area except the first area as the second area.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
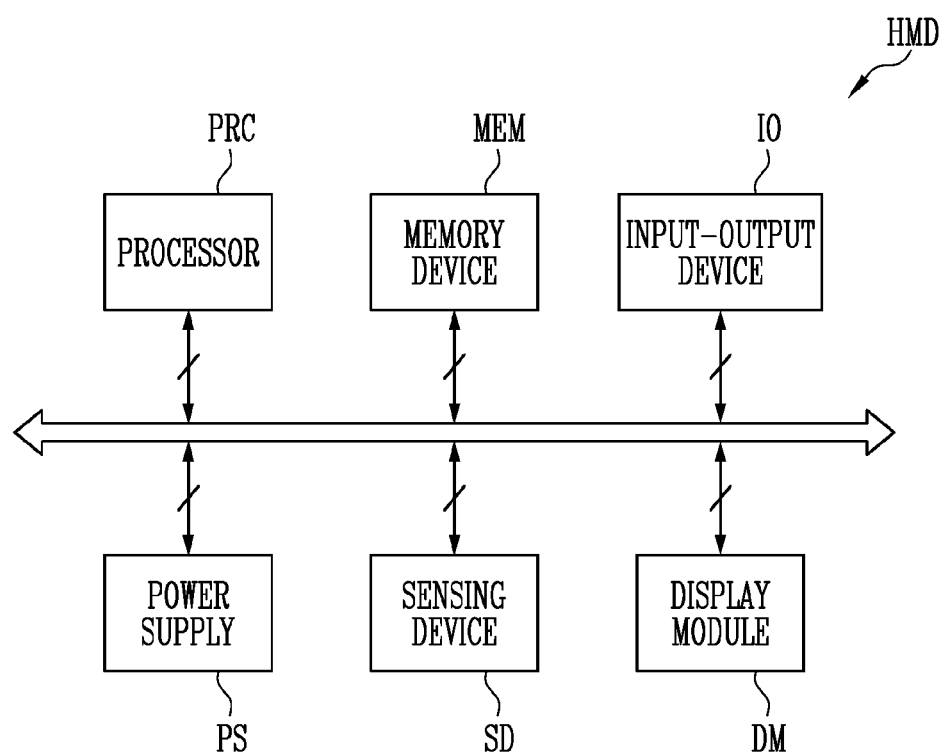
FIG. 1 is a block diagram illustrating a head mounted display device in accordance with embodiments of the present disclosure.

Hereinafter, exemplary embodiments of the present disclosure will be described in more detail with reference to the accompanying drawings. Throughout the drawings, the same reference numerals are given to the same elements, and their overlapping descriptions will be omitted.

FIG. 1 is a block diagram illustrating a head mounted display device in accordance with embodiments of the present disclosure.

Referring to FIG. 1, the Head Mounted Display Device HMD may include a processor PRC, a memory device MEM, an input/output device IO, a power supply PS, a sensing device SD, and a display module DM. The components of the head mounted display device HMD are not limited to FIG. 1, and the head mounted display device HMD may have components of which number is greater or smaller than that of the components shown in FIG. 1.

The processor PRC may perform specific calculations or tasks. The processor PRC may control overall operations of the head mounted display device HMD. The processor PRC may process signals, data information, and the like which are input through the input/output device IO, or drive an application program stored in the memory device MEM to provide a user with appropriate information or functions or to process the appropriate information or functions. In an embodiment, the processor PRC may be a microprocessor, a Central Processing Unit (CPU), an Application Processor (AP), a Communication Processor (CP), or the like. The processor PRC may be connected to other components through an address bus, a control bus, a data bus, and the like. Also, the processor PRC may be connected to an expansion bus such as a Peripheral Component Interconnection (PCI).

The memory device MEM may store data necessary for operations of the head mount device HMD. The memory device MEM may store a plurality of application programs for driving the head mounted display device HMD and data, commands, and the like for operations of the head mounted display device HMD. At least some of the plurality of application programs may be downloaded from an external server through the input/output device IO. Also, for example, the memory device MEM may include a nonvolatile memory device such as an Erasable Programmable Read Only Memory (EPROM), an Electrically Erasable Programmable Read Only Memory EEPROM, a flash memory, a Phase Change Random Access Memory (PRAM), a Resistance Random Access Memory (RRAM), a Magnetic Random Access Memory (MRAM), or a Ferroelectric Random Access Memory (FRAM), and/or a volatile memory device such as a Dynamic Random Access Memory (DRAM), a Static Random Access Memory (SRAM), or a mobile DRAM.

The input/output device IO may include an input means including a camera or image input unit for image signal input, a microphone or audio input unit for audio signal input, a user input unit (e.g., a touch key, a push key, a joystick, a wheel key, or the like), and the like, and an output means including a sound output unit, a haptic module, an optical output unit, and the like which are used to generate an output associated with a sense of sight, a sense of hearing, a sense of touch, or the like. The display module DM may be provided in the input/output device IO.

The power supply PS may supply power necessary for operations of the head mounted display device HMD. The power supply PS may supply external power and internal power to each of the components included in the head mounted display device HMD. The power supply PS may include a battery, and be implemented with an embedded battery or a replaceable battery.

The sensing device SD may include at least one sensor for sensing peripheral environment information surrounding the head mounted display device HMD, user information, and the like. For example, the sensing device SD may include an acceleration sensor, a gravity sensor, an illuminance sensor, a motion sensor, a fingerprint recognition sensor, an optical sensor, an ultrasonic sensor, a heat sensor, and the like.

The display module DM may be connected to other components through the buses or another communication link. The display module DM may display information processed in the head mounted display device HMD.

Figure 2:
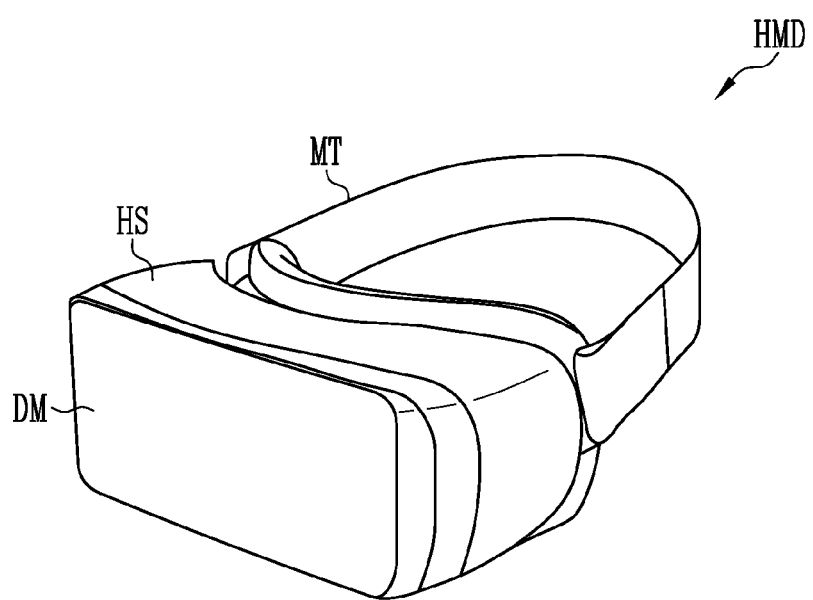
FIG. 2 is a diagram illustrating an example in which a head mounted display device is implemented in accordance with embodiments of the present disclosure.

FIG. 2 is a diagram illustrating an example in which a head mounted display device is implemented in accordance with embodiments of the present disclosure.

Referring to FIG. 2, the head mounted display device HMD may include a display module DM, a housing HS, and a mounting part MT. The head mounted display device HMD may be mounted on a head of a user to provide image information to the user. The display module DM may display an image in response to an image signal.

The display module DM may provide images respectively to left and right eyes of the user. A left-eye image corresponding to the left eye of the user and a right-eye image corresponding to the right eye of the user may be equal to or different from each other. The head mounted display device HMD may provide a 2D image, a 3D image, a virtual reality image, a 360-degree panoramic image, and the like through the display module DM. The display module DM may include at least one of a Liquid Crystal Display (LCD), an Organic Light Emitting Display (OLED), an inorganic light emitting display device, and a flexible display device. The display module DM may be built in the housing HS or be coupled to the housing HS. The display module DM may receive a command through an interface part or the like which is provided in the housing HS.

The housing HS may be located at the front of the eyes of the user. The components for operating the head mounted display device HMD may be accommodated in the housing HS. In addition, a wireless communication part, an interface part, and the like may be located in the housing HS. The wireless communication part may receive an image signal from an external terminal by performing wireless communication with the external terminal. For example, the wireless communication part may communicate with the external terminal by using Bluetooth, Radio Frequency Identification (RFID), Infrared Data Association (IrDA), Zigbee, Near Field Communication (NFC), Wireless-Fidelity (Wi-Fi), Ultra Wideband (UWB), or the like. The interface part may connect the head mounted display device HMD to an external device. For example, the interface part of the head mounted display device HMD may include at least one of a wired/wireless headset port, an external charger port, a wired/wireless data port, a memory card port, an identification module port, an audio input/output (I/O) port, a video I/O port, and an earphone port.

The mounting part MT may be connected to the housing HS to allow the head mounted display device HMD to be fixed to the head of the user. For example, the mounting part MT may be implemented as a belt, a band having elasticity, or the like.

Figure 3:
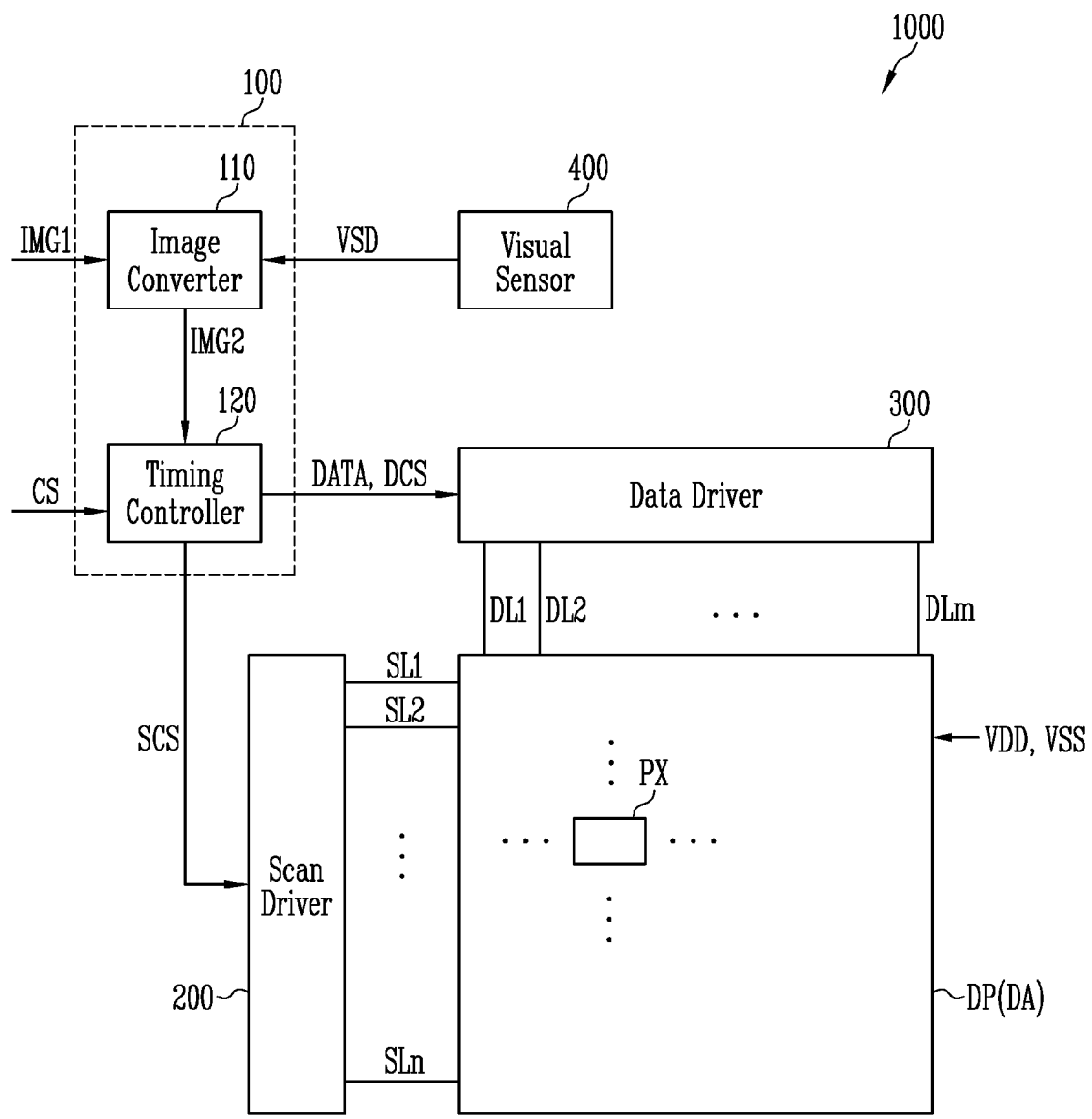
FIG. 3 is a block diagram illustrating a display device in accordance with embodiments of the present disclosure.

FIG. 3 is a block diagram illustrating a display device in accordance with embodiments of the present disclosure.

Referring to FIG. 3, the display device 1000 may include a display panel DP, a controller 100, a scan driver 200, and a data driver 300. In some embodiments, the display device 1000 may further include a visual sensor 400.

The display panel DP may include a plurality of scan lines SL1 to SLn (n is an integer greater than 0), a plurality of data lines DL1 to DLm (m is an integer greater than 0), and a plurality of pixels PX.

Each of the pixels PX may be connected to at least one of the scan lines SL1 to SLn and at least one of the data lines DL1 to DLm. Each of the pixels PX may emit light with a luminance corresponding to a data signal provided through a corresponding data line in response to a scan signal provided through a corresponding scan line. Meanwhile, the pixels PX may be supplied with voltages of a first power source VDD and a second power source VSS from the outside. The voltages of the first power source VDD and the second power source VSS are voltages necessary for an operation of the pixels PX. For example, the first power source VDD may have a voltage level higher than that of the second power source VSS.

Each of the pixels PX may include a light emitting element and a pixel driving circuit connected to the light emitting element. For example, the light emitting element may be an organic light emitting diode or an inorganic light emitting diode such as a micro LED (light emitting diode) or a quantum dot light emitting diode. Also, the light emitting element may be a light emitting element configured with a combination of an organic material and an inorganic material. Further, each of the pixels PX may include a single light emitting element. Alternatively, in another embodiment, each of the pixels PX may include a plurality of light emitting elements, and the plurality of light emitting element may be connected in series, parallel, or series/parallel to each other.

The display panel DP may display an image on a display area DA based on a data signal.

In an embodiment, the display panel DP may include a first sub-display area and a second sub-display area as the display area DA. For example, when the display device 1000 is implemented as the head mounted display device HMD described with reference to FIGS. 1 and 2, the display panel DP may include a first sub-display area for displaying a left-eye image and a second sub-display area for displaying a right-eye image so as to provide images respectively to left and right eyes of a user.

The controller 100 may include an image converter 110 and a timing controller 120.

The image converter 110 may receive a first image signal IMG1 from a processor (e.g., the processor PRC shown in FIG. 1) and receive visual sensing data VSD from the visual sensor 400. The first image signal IMG1 may include grayscales of each pixels in a frame.

Meanwhile, when the user views a display image by using the display device 1000, the line of sight of the user may be changed according to a viewing environment of the user, a change in the line of sight according to the movement of an image, and the like, and the field of view of the user may be changed since the size of pupils of the user is changed according to the luminance of the display image, the brightness of external light, or the like (e.g., the size of the pupils of the user becomes small when the luminance of the display image or the brightness of the external light is increased). When the line of sight of the user and the field of view of the user are changed, an area in which the user visually recognizes an image in the display area DA may be changed.

For example, when the display device 1000 is implemented as the head mounted display device HMD described with reference to FIGS. 1 and 2, the head mounted display device HMD is mounted on a head of the user to provide a display image to the user, and therefore, the distance between the display module DM of the head mounted display device HMD (or the display panel DP of the display device 1000 shown in FIG. 3) and eyes of the user may be relatively close. Because the distance between the display module DM and the eyes of the user is relatively close, the size of the field of view of the user is limited. Therefore, the user may not visually recognize the entire area of the display area DA. That is, an area which is not visually recognized by the user (or is recognized relatively little by the user) in the display area DA may be existed.

Accordingly, when the user views an image displayed on the display area DA of the display device 1000, the display area DA may include a viewing area (or first area) which is visually recognized by the user and a non-viewing area (or second area) which is not visually recognized (or is recognized relatively little) by the user due to the ling of sight of the user, the field of view of the user, and the like. The non-viewing area may correspond to an area except the viewing area in the display area DA. Since an image displayed in the non-viewing area is not visually recognized by the user (or is recognized relatively little by the user), unnecessary power consumption may occur in the non-viewing area when the display device 1000 (or the display panel DP) displays an image with the same luminance as the viewing area in the non-viewing area.

Accordingly, in order to prevent unnecessary power consumption in the non-viewing area, the image converter 110 in accordance with the embodiments of the present disclosure may extract visual information on the line of sight of the user, the field of view of the user, and the like by analyzing the visual sensing data VSD. The image converter 110 may generate a second image signal IMG2 by converting grayscales of the first image signal IMG1 corresponding to the visual information.

For example, the image converter 110 may extract first visual information on the line of sight of the user and second visual information on the field of view of the user based on the visual sensing data VSD, determine a viewing area and a non-viewing area in the display area DA based on the first visual information and the second visual information, and generate the second image signal IMG2 by converting (e.g., decreasing) grayscales corresponding to the non-viewing area among the grayscales of the first image signal IMG1. The luminance of an image displayed in the non-viewing area may be controlled corresponding to the second image signal IMG2 obtained by converting the first image signal IMG1. Accordingly, in the display device 1000 in accordance with the embodiments of the present disclosure, power consumption can be minimized while not deteriorating the visibility of the user.

The timing controller 120 may receive a control signal CS from the processor (e.g., the processor PRC shown in FIG. 1). The control signal CS may include a horizontal synchronization signal, a vertical synchronization signal, a clock signal, and the like. The timing controller 120 generate a first control signal SCS and a second control signal DCS based on the control signal CS. The first control signal SCS may be provided to the scan driver 200 and the second control signal DCS may be provided to the data driver 300.

Also, the timing controller 120 may convert the second image signal IMG2 provided from the image converter 110, thereby generating image data DATA.

Meanwhile, although a case where the image converter 110 and the timing controller 120 are components separate from each other has been illustrated in FIG. 3, this is merely illustrative for convenience of description and the image converter 110 and the timing controller 120 may be integrally configured. For example, the image converter 110 may be embedded in the timing controller 120.

The scan driver 200 may receive the first control signal SCS from the timing controller 120 and supply a scan signal to the scan lines SL1 to SLn in response to the first control signal SCS. For example, the scan signal may be sequentially supplied to the scan lines SL1 to SLn.

The scan signal may include a gate-on voltage (e.g., a low voltage or a high voltage). A transistor receiving the gate-on voltage may be turned-on.

The data driver 300 may receive the second control signal DCS and the image data DATA from the timing controller 120. The data driver 300 may supply a data signal (or data voltage) corresponding to the second image IMG2 (or the image data DATA) to the data lines DL1 to DLm, in response to the second control signal DCS.

The visual sensor 400 may generate visual sensing data VSD by sensing an eye of the user. In some embodiments, the visual sensor 400 may include a camera which acquires an image corresponding to the eyes of the user by photographing the eyes of the user. The visual sensing data VSD may include the image corresponding to the eyes of the user.

For example, the visual sensor 400 may include an infrared camera using a bright pupil method or an infrared camera using a dark pupil method. In the bright pupil method, the visual sensor 400 (or the infrared camera) may allow the center of a pupil of the eyes of the user to become bright by irradiating light (infrared light) to be parallel to a central axis of the pupil at a distance spaced apart from the eye of the user, which is an object to be detected, at a predetermined distance, and acquire an image corresponding to the eyes of the user by detecting light reflected from a retina of the eyes of the user. In the dark pupil method, the visual sensor 400 (or the infrared camera) may allow the center of the pupil of the eye of the user to become darker than an iris of the eye of the user by irradiating light (infrared light) to form a predetermined angle with the central axis of the pupil of the eyes of the user, which is an object to be detected, and acquire an image corresponding to the eyes of the user by detecting light reflected from the retina of the eyes of the user. However, the embodiment of the present disclosure is not limited thereto, and the visual sensor 400 may include both the infrared camera using the bright pupil method and the infrared camera using the dark pupil method.

Meanwhile, when the camera included in the visual sensor 400 is implemented as an infrared camera, infrared light irradiated onto the eyes of the user to photograph the eyes of the user does not cause loss of the sight of the eyes of the user.

Although a case where the camera included in the visual sensor 400 is an infrared camera has been described in FIG. 3, the present disclosure is not limited thereto. For example, the camera included in the visual sensor 400 may be a visible light camera.

In an embodiment, the visual sensor 400 may acquire an image by photographing the eyes of the user for every frame. The visual sensor 400 may generate visual sensing data VSD and provide the generated visual sensing data VSD to the image converter 110 only when a change in size of the pupil of the user or a change in position of the pupil of the user is sensed in the image acquired by photographing the eyes of the user (i.e., only in a frame in which the change in size of the pupil of the user or the change in position of the pupil of the user is sensed). That is, the visual sensor 400 may generate visual sensing data VSD and provide the generated visual sensing data VSD to the image converter 110, only when a change in visual information is sensed according to the image acquired by photographing the eye of the user.

Specifically, when at least one of the change in size of the pupil of the user or the change in position of the pupil of the user is sensed, the visual sensor 400 may generate visual sensing data VSD and provide the generated visual sensing data VSD to the image converter 110. The image converter 110 may extract visual information (e.g., first visual information and second visual information) by analyzing the visual sensing data VSD as described above. Therefore, the image converter 110 may determine a viewing area and a non-viewing area, and generate a second image signal IMG2 by converting a first image signal IMG1.

On the other hand, when both the change in size of the pupil of the user and the change in position of the pupil of the user are not sensed, the visual sensor 400 may not provide the visual sensing data VSD to the image converter 110. The image converter 110 may generate a second image signal IMG2 by converting a first image signal IMG1 of a corresponding frame (second frame) based on a viewing area and a non-viewing area which are determined corresponding to a previous frame (first frame). Since an operation in which the image converter 110 extracts visual information by analyzing the above-described visual sensing data VSD in the corresponding frame, or the like is omitted, the load according to a calculation operation of the image converter 110 can be decreased.

The image converter 110 (or the controller 100) may further include a memory for storing information on the viewing area and the non-viewing area corresponding to the previous frame.

Meanwhile, when the display device 1000 is implemented as a head mounted display device HMD described with reference to FIGS. 1 and 2, the visual sensor 400 may be disposed on the housing HS of the head mounted display device HMD to sense the eyes of the user. However, the embodiment of the present disclosure is not limited thereto. For example, the visual sensor 400 may be disposed in an area in which any image is not displayed on the display module DM to sense the eyes of the user.

Also, when the display device 1000 is implemented as a head mounted display device HMD described with reference to FIGS. 1 and 2, the visual sensor 400 may include two sub-visual sensors for respectively sensing the left and right eyes of the user. The image converter 110 may receive visual sensing data VSD respectively from the two sub-visual sensors, and generate second images signal IMG2 by converting first images signal IMG1 respectively corresponding to a left-eye image and a right-eye image.

Figure 4:
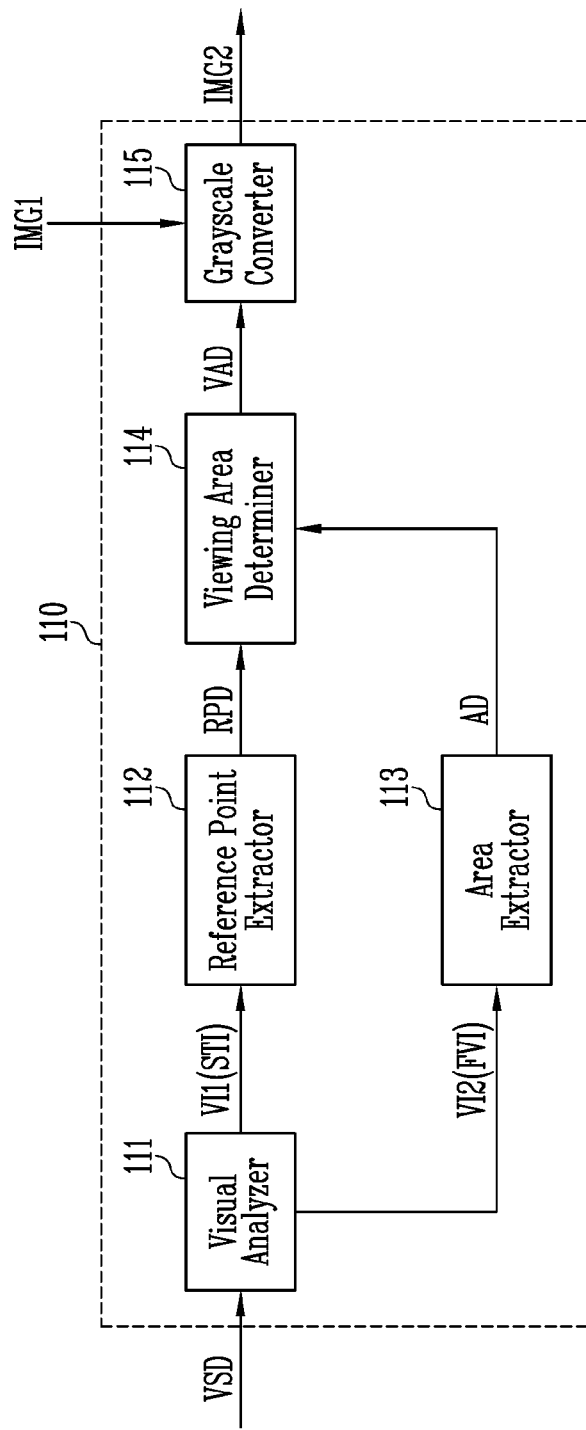
FIG. 4 is a block diagram illustrating an example of an image converter included in the display device shown in FIG. 3.

FIG. 4 is a block diagram illustrating an example of the image converter included in the display device shown in FIG. 3.

Referring to FIGS. 3 and 4, the image converter 110 may include a visual analyzer 111, a reference point extractor 112, an area extractor 113, a viewing area determiner 114, and a grayscale converter 115.

The visual analyzer 111 may generate first visual information VI1 and second visual information VI2 based on visual sensing data VSD. For example, the visual analyzer 111 may generate the first visual information VI1 including information ST1 on the line of sight of the user viewing the display area DA and the second visual information VI2 including information FV1 on the field of view of the user by analyzing the visual sensing data VSD.

As described with reference to FIG. 3, when the visual sensor 400 includes a camera (e.g., an infrared camera), the visual analyzer 111 may generate the first visual information VI1 and the second visual information VI2 by analyzing eye images of the user included in the visual sensing data VSD.

For example, the visual analyzer 111 may extract a position and a size of the pupil of the eyes of the user by applying the eye images of the user to images of the eyes of the user which is modeled in advance. In an example, the visual analyzer 111 may extract the position and size of the pupil of the eyes of the user by using a regression model learning method.

However, the operation in which the visual analyzer 111 extracts the position and size of the pupil of the eyes of the user is not limited thereto. For example, the visual analyzer 111 may extract the position and size of the pupil of the eyes of the user by using a projection function, a Hough transform, or the like with respect to the eye images of the user.

In some embodiments, the visual analyzer 111 may estimate a line of sight of the user using the extracted position of the pupil (or a central position of the pupil), thereby generating the first visual information VI1.

For example, the visual analyzer 111 may estimate an extension line along a normal direction from a center of the pupil in the visual sensing data VSD as the line of sight of the user.

Also, the visual analyzer 111 may estimate a viewing angle of the user using the extracted size of the pupil in the visual sensing data VSD, thereby generating the second visual information VI2.

For example, the visual analyzer 111 may estimate a viewing angle corresponding to an area which is to be visually recognized to the user on the display area DA through the pupil from the retina by using the size of the pupil.

The operation in which the visual analyzer 111 generates the first visual information VI1 and the second visual information VI2 by analyzing the visual sensing data VSD will be described in detail with reference to FIGS. 5A to 5C.

The first visual information VI1 may be provided to the reference point extractor 112 and the second visual information VI2 may be provided to the area extractor 113.

The reference point extractor 112 may generate a reference point data RPD corresponding to a point (hereinafter, referred to as a reference point) corresponding to the line of sight of the user on the display area DA based on the first visual information VI1.

For example, the reference point extractor 112 may determine a point at which an extension line corresponding to the line of sight of the user and the display area DA meet each other as the reference point, thereby generating the reference point data RPD. The reference point is a point at which the line of sight of the user is most concentrated on the display area DA and may correspond to a center point in the viewing area described with reference to FIG. 3.

The area extractor 113 may generate area data AD corresponding to a size of an area visually recognized by the user (or visual area) based on the second visual information VI2.

For example, the area extractor 113 may generate the area data AD by detecting the size of an area visually recognized by the user (or visual area) by a viewing angle of the user. The size of the area visually recognized by the user may correspond to the viewing area described with reference to FIG. 3.

The reference point data RPD generated by the reference point extractor 112 and the area data AD generated by the area extractor 113 may be provided to the viewing area determiner 114.

The viewing area determiner 114 may generate visible area data VAD by detecting a viewing area corresponding to the area visually recognized by the user on the display area DA and a non-viewing area except the viewing area based on the reference point data RPD and the area data AD.

For example, the viewing area determiner 114 may determine a viewing area by setting a reference point corresponding to the reference point data RPD as the center point of the viewing area and setting a visual area corresponding to the area data AD as the viewing area.

The grayscale converter 115 may receive a first image signal IMG1 and convert the first image signal IMG1 to a second image signal IMG2 based on the viewing area data VAD provided from the viewing area determiner 114.

The grayscale converter 115 may specify pixels corresponding to the non-viewing area in the display area DA and generate the second image signal IMG2 by converting grayscales of the pixels in the non-viewing area in the first image signal IMG1.

In some embodiments, the grayscale converter 115 may generate the second image signal IMG2 by decreasing the grayscales of the pixels corresponding to the non-viewing area in the first image signal IMG1.

For example, the grayscale converter 115 may generate the second image signal IMG2 by converting the grayscales of the pixels corresponding to the non-viewing area in the first image signal IMG1 into grayscale 0. That is, grayscales of pixels corresponding to the non-viewing area among grayscales of the second image signal IMG2 may be the grayscale 0. Accordingly, any image is not displayed in the non-viewing area in the display area DA (i.e., the pixels corresponding to the non-viewing area may be turned-off).

In another example, the grayscale converter 115 may generate the second image signal IMG2 by gradually decreasing the grayscales of the pixels corresponding to the non-viewing area in the first image signal IMG1 such that the luminance of an image displayed in the non-viewing area gradually decreases as a distance from the viewing area increases. For example, the grayscale converter 115 may generate the second image signal IMG2 corresponding to the non-viewing area by multiplying a proportional constant to the first image signal IMG1. The proportional constant has a value which is greater than or equal to 0 and is less than 1, and may have a smaller value as the distant from the viewing area increases. Accordingly, the luminance of an image displayed in the non-viewing area in the display area DA may decrease as the distant from the viewing area increases.

As described with reference to FIGS. 3 and 4, the image converter 110 in accordance with the embodiments of the present disclosure may generate first visual information VI1 and second visual information VI2 by analyzing visual sensing data VSD, determine a viewing area on the display area DA based on the first visual information VI1 and the second visual information VI2, and generate a second image signal IMG2 by converting grayscales corresponding to a non-viewing area except the viewing area among grayscales of a first image signal IMG1. Accordingly, the image converter 110 (or the display device 1000) in accordance with the embodiments of the present disclosure controls (e.g., decreases) the luminance of an image displayed on the non-viewing area of the display area DA in the second image signal IMG2, thereby decreasing power consumption. Further, since the non-viewing area corresponds to an area which is not visually recognized to the user (or is recognized relatively little by the user), the visibility of the user is not deteriorated even when the luminance is controlled in the non-viewing area.

Figure 5A:
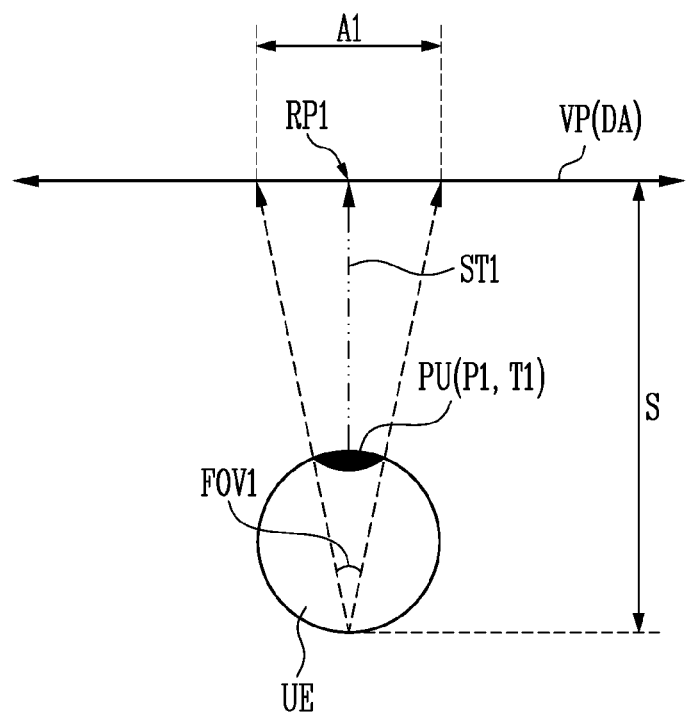
FIGS. 5A, 5B and 5C are diagrams illustrating an example of operations of a visual analyzer, a reference point extractor, and an area extractor, which are included in the image converter shown in FIG. 4.
Figure 5B:
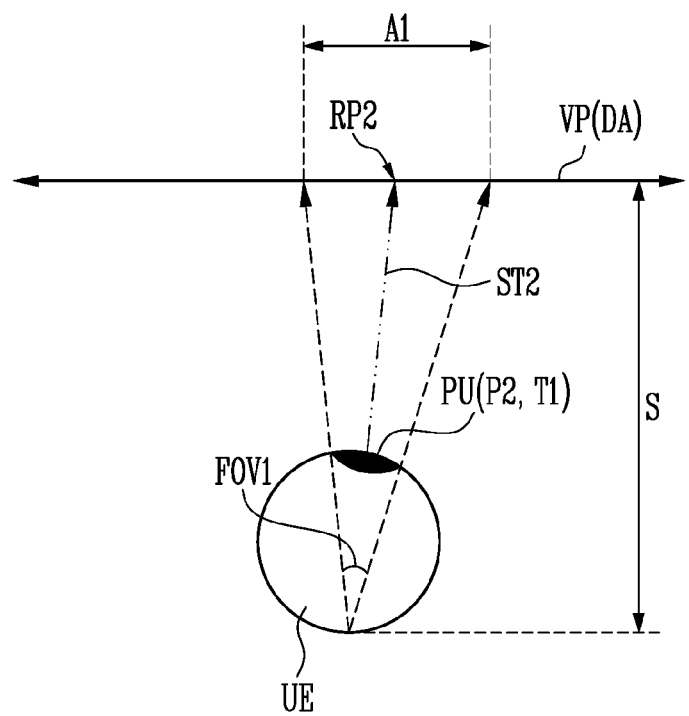
Figure 5C:
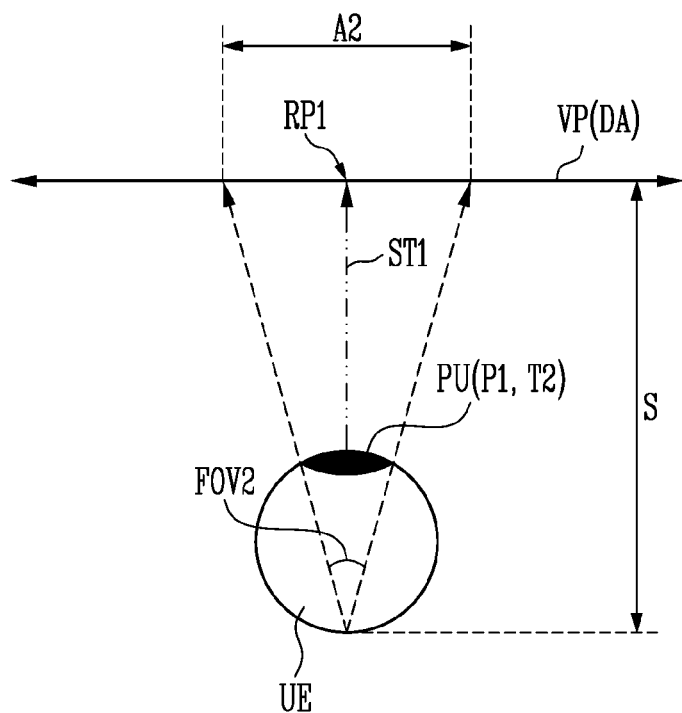
Figure 6A:
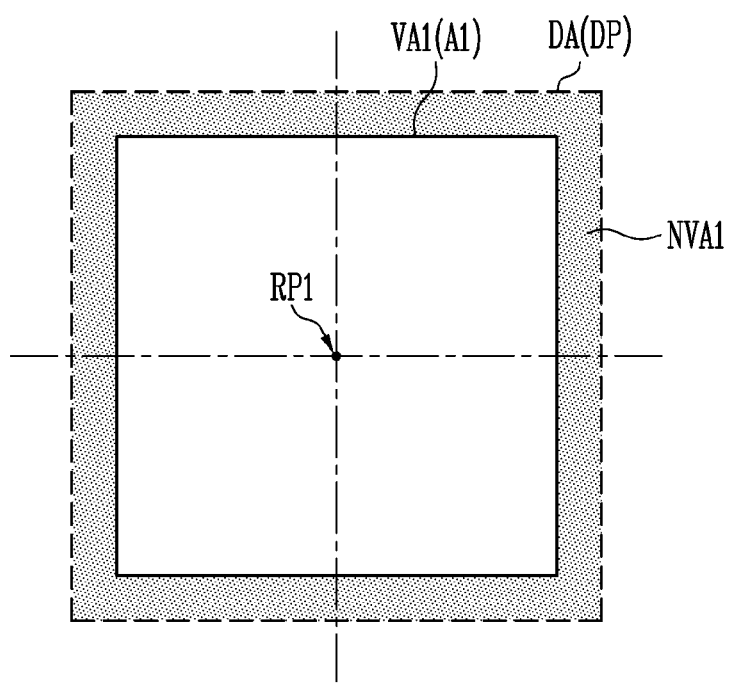
FIGS. 6A, 6B and 6C are diagrams illustrating an example of a grayscale converter included in the image converter shown in FIG. 4.
Figure 6B:
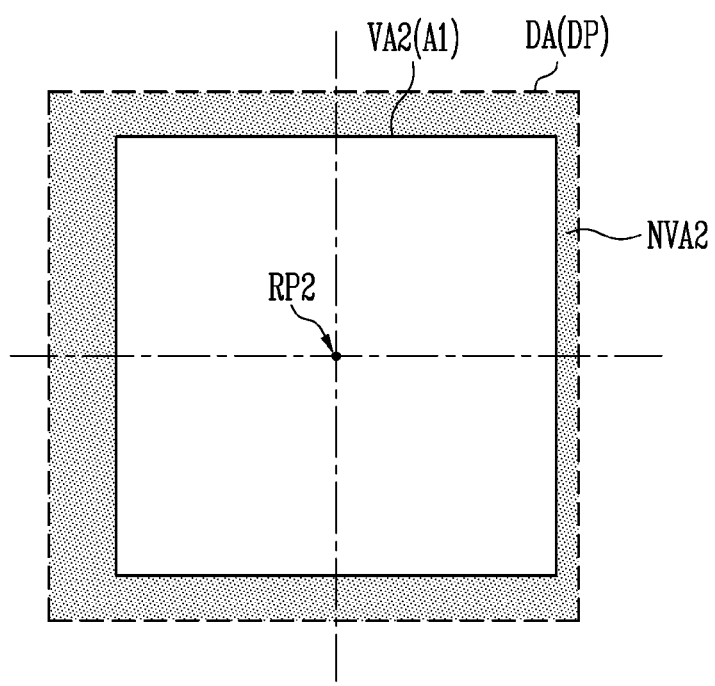
Figure 6C:
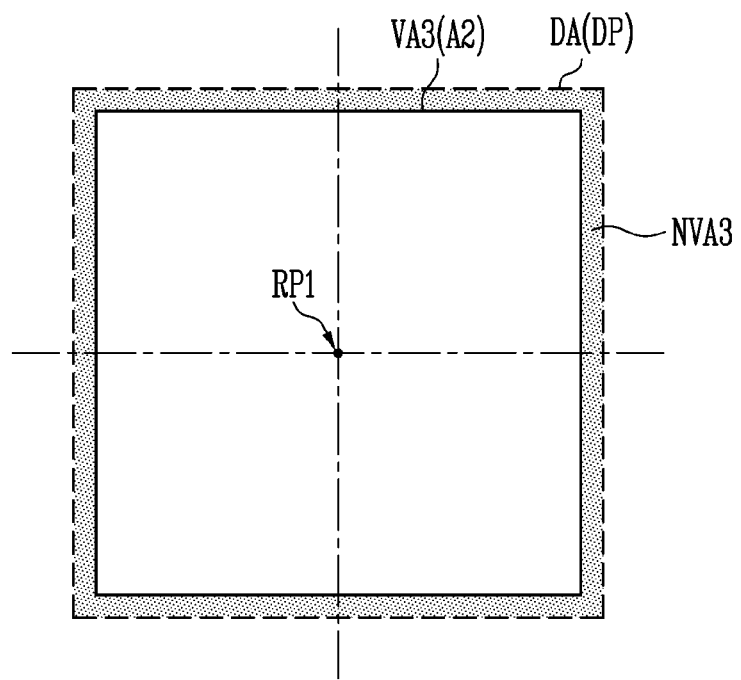

FIGS. 5A and 5C are diagrams illustrating an example of operations of the visual analyzer, the reference point extractor, and the area extractor which are included in the image converter shown in FIG. 4. FIGS. 6A to 6C are diagrams illustrating an example of the grayscale converter included in the image converter shown in FIG. 4. Meanwhile, a virtual plane VP which corresponds to a surface of the display panel DP in the display area DA is illustrated in FIGS. 5A to 5C.

First, referring to FIGS. 4, 5A, 5B, 6A, and 6B, a case where viewing angles (or sizes of a pupil) of a user are the same, but the line of sight of the user (or the central position of the pupil) moves will be described.

Referring to FIGS. 4 and 5A, when the central position of a pupil PU of a user eye UE is at a first position P1 as shown in FIG. 5A, the visual analyzer 111 may estimate an extension line along a normal direction at the first position P1 with respect to the user eye UE having a spherical shape as a line of sight of the user (e.g., a first sight ST1).

The reference point extractor 112 may determine a point at which the line of sight (e.g., the first sight ST1) of the user and the virtual plane VP meet each other as a reference point (e.g., a first reference point RP1).

In addition, when the size (or diameter) of the pupil PU of the user eye UE is a first size T1 as shown in FIG. 5A, the visual analyzer 111 may estimate a first viewing angle FOV1 corresponding to an area (e.g., a first visual area A1) which is to be visually recognized by the user through the pupil by using the first size T1. The viewing angle (e.g., the first viewing angle FOV1) of the user may correspond to an angle formed between lines connecting both ends of the pupil PU to a certain point at a retina of the user eye UE in which an image is focused.

The area extractor 113 may detect the first visual area A1 (or an extent of the first visual area A1) by using a distance S between the virtual plane VP and the certain point at the retina of the user eye UE and the first viewing angle FOV1.

Meanwhile, in order to measure the distance S between the retina of the user eye UE and the display area DA (i.e., the virtual plane VP), the visual sensor (400 shown in FIG. 3) in the display device (1000 shown in FIG. 3) may further include a distance measuring sensor. For example, the distance measuring sensor may be an ultrasonic sensor which measures a distance between the retina of the user eye UE and the display panel DP (or the display area DA) by measuring a time for which an ultrasonic wave is reflected and then return.

However, the embodiment of the present disclosure is not limited thereto, and the distance S between the retina of the user eye UE and the display area DA (i.e., the virtual plane VP) may have a predetermined value according to a device in which the display device (1000 shown in FIG. 3) is implemented, a viewing environment of the user, and the like. For example, as described with reference to FIG. 3, when the display device (1000 shown in FIG. 3) is implemented as the head mounted display device (HMD shown in FIG. 2), the distance between the user eye UE of the user wearing the head mounted display device (HMD shown in FIG. 2) and the display panel DP (or the display area DA) may be determined according to the configuration of components (e.g., the display module DM, the housing HS, and the like) included in the head mounted display device (HMD shown in FIG. 2). Accordingly, the area extractor 113 can extract the first visual area A1 (or an extent of the first visual area A1) according to a viewing angle by using a predetermined distance S value without using a distance sensor.

Further referring to FIG. 6A, the viewing area determiner 114 may determine a viewing area (e.g., a first viewing area VA1) which has an area equal to that of the first visual area A1 by using a first reference point RP1 as a center point, based on reference point data RPD and area data AD. For example, as described with reference to FIG. 4, the viewing area determiner 114 may set a reference point corresponding to the reference point data RPD as a center point of the viewing area, and a reference point of the first viewing area VA1 in FIG. 6A may correspond to the first reference point RP1. Also, the viewing area determiner 114 may set a visual area corresponding to area data AD as the viewing area, and the first viewing area VA1 in FIG. 6A may correspond to the first visual area A1.

Referring to FIGS. 4 and 5B, when the central position of the pupil PU of the user eye UE is at a second position P2 as shown in FIG. 5B, the visual analyzer 111 may estimate an extension line along a normal direction at the second position P2 with respect to the user eye UE as a line of sight of the user (e.g., a second sight ST2).

The reference point extractor 112 may determine a point at which the sight (e.g., the second sight ST2) of the user which corresponds to the second position P2 and the virtual plane VP meet each other as a reference point (e.g., a second reference point RP2).

Meanwhile, in FIGS. 5A and 5B, since the size (or diameter) of the pupil PU of the user eye UE is the first size T1, a viewing angle estimated by the visual analyzer 111 in FIG. 5B may be equal to the first viewing angle FOV1 estimated by the visual analyzer 111 in FIG. 5A, and an area (or an extent of the area) detected by the area extractor 113 in FIG. 5B may be identical to the first visual area A1 (or the extent of the first visual area A1) detected by the area extractor 113 in FIG. 5A.

Further referring to FIG. 6B, the viewing area determiner 114 may determine a viewing area (e.g., a second viewing area VA2) which has an area equal to that of the first visual area A1 by using a second reference point RP2 as a center point, based on reference point data RPD and area data AD. For example, as described with reference to FIG. 4, the viewing area determiner 114 may set a reference point corresponding to the reference point data RPD as a center point of the viewing area, and a reference point of the second viewing area VA2 in FIG. 6B may correspond to the second reference point RP2. Also, the viewing area determiner 114 may set a visual area corresponding to the area data AD as the viewing area, and the second viewing area VA2 in FIG. 6B may correspond to the first visual area A1.

As described above, when viewing angles (or sizes of the pupil) of the user are the same, but the line of sight of the user (or the central position of the pupil) moves, the viewing area are the same, but the position of the viewing area may be changed. For example, in FIGS. 6A and 6B, the viewing areas VA1 and VA2 are the same as that of the first visual area A1, but reference points of the viewing areas VA1 and VA2 may move from the first reference point RP1 of the first viewing area VA1 to the second reference point RP2 of the second viewing area VA2.

Next, referring to FIGS. 4, 5A, 5C, 6A, and 6C, a case where lines of sights (or central positions of the pupil) of the user are the same, but the viewing angle (or the size of the pupil) of the user is changed will be described.

Referring to FIGS. 4 and 5C, when the size (or diameter) of the pupil PU of the user eye UE has a second size T2 as shown in FIG. 5C, the visual analyzer 111 may estimate a second viewing angle FOV2 corresponding to an area (e.g., a second visual area A2) which the user can visually recognize through the pupil PU from the retina of the user eye UE by using the second size T2.

Similarly to as described with reference to FIG. 5A, the area extractor 113 may detect the second visual area A2 (or an extent of the second visual area A2) by using the distance S between the virtual plane VP and the retina of the user eye UE and the second viewing angle FOV2.

Since the extent of the area which the user can visually recognize becomes wider as the size of the pupil PU becomes larger, the viewing angle may also become larger. For example, the first viewing angle FOV1 corresponding to the first size T1 may be smaller than the second viewing angle FOV2 corresponding to the second size T2. Accordingly, the second visual area A2 may be wider than the first visual area A1.

Meanwhile, in FIGS. 5A and 5C, since central positions of the pupil PU of the user eye UE are the same as the first position P1, a line of sight of the user, which is estimated by the visual analyzer 111, in FIG. 5C may be identical to the first sight ST1 estimated by the visual analyzer in FIG. 5A, and a reference point determined by the reference point extractor 112 in FIG. 5C may be equal to the first reference point RP1 determined by the reference point extractor 112 in FIG. 5A.

Further referring to FIG. 6C, the viewing area determiner 114 may determine a viewing area (e.g., a third viewing area VA3) which has an area equal to that of the second visual area A2 (e.g., wider than the first visual area A1) by using the first reference point RP1 as a center point based on reference point data RPD and area data AD. For example, as described with reference to FIG. 4, the viewing area determiner 114 may set a reference point corresponding to the reference point data RPD as a center point of the viewing area, and a reference point of the third viewing area VA3 in FIG. 6C may correspond to the first reference point RP1. Also, the viewing area determiner 114 may determine a visual area corresponding to area data AD as the viewing area, and the third viewing area VA3 in FIG. 6C may correspond to the second visual area A2.

As described above, when lines of sights (or central positions of the pupil) of the user are the same, but the viewing angle (or the size of the pupil) of the user is changed, centers of viewing areas are the same, but the viewing areas may be changed. For example, the reference points of the viewing areas VA1 and VA3 are the same as the first reference point RP1, but the viewing areas VA1 and VA3 may be changed from the first viewing area VA1 (e.g., the extent of the first visual area A1) to the third viewing area VA3 (e.g., the extent of the second visual area A2).

Meanwhile, as described with reference to FIG. 4, the grayscale converter 115 may generate a second image signal IMG2 by converting grayscales of pixels corresponding to a non-viewing area in a first image signal IMG1. For example, in FIG. 6A, the grayscale converter 115 may convert grayscales of pixels corresponding to a first non-viewing area NVA1 in the first image signal IMG1. In another example, in FIG. 6B, the grayscale converter 115 may convert grayscales of pixels corresponding to a second non-viewing area NVA2 in the first image signal IMG1. In still another example, in FIG. 6C, the grayscale converter 115 may convert grayscales of pixels corresponding to a third non-viewing area NVA3 in the first image signal IMG1.

Figure 7:
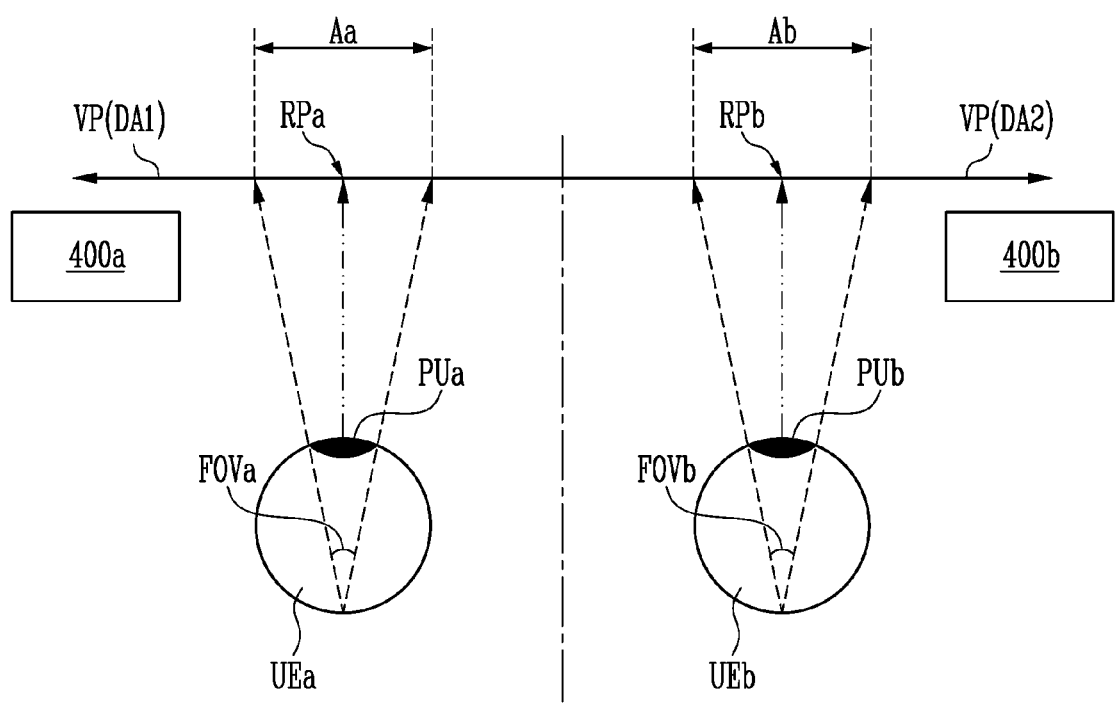
FIG. 7 is a diagram illustrating an example of a visual sensor included in the display device shown in FIG. 3.

FIG. 7 is a diagram illustrating an example of the visual sensor included in the display device shown in FIG. 3.

As described with reference to FIG. 1, when the display device 1000 shown in FIG. 3 is implemented as the head mounted display device HMD described with reference to FIGS. 1 and 2, the visual sensor 400 may include two sub-visual sensors.

Referring to FIGS. 3, 4, and 7, the visual sensor 400 may include sub-visual sensors 400a and 400b which generate visual sensing data VSD by respectively sensing a left eye UEa and a right eye UEb of a user eye UE.

The user eye UE may include the left eye UEa and the right eye UEb. It is necessary to generate visual sensing data VSD about each of a left-eye image (e.g., an image provided on a first sub-display area DA1) and a right-eye image (e.g., an image provided on a second sub-display area DA2) because the visual sensing data VSD of a left-eye image and a right-eye image may be different according to a distance between the left eye UEa and the right eye UEb, a central position and a size difference between a pupil PUa of the left eye UEa and a pupil Pub of the right eye UEb due to a viewing environment and a display image, and the like.

Accordingly, a first sub-visual sensor 400a may generate visual sensing data VSD by sensing the left eye UEa. The image converter 110 may determine a left-eye viewing area corresponding to the left eye UEa on the first sub-display area DA1 by detecting a reference point RPa and a visual area Aa (or viewing angle FOVa) according to a central position and a size of the pupil PUa of the left eye UEa based on the visual sensing data VSD, and generate a second image signal IMG2 by converting a first image IMG1 signal corresponding to the left-eye image.

Similarly, a second sub-visual sensor 400b may generate visual sensing data VSD by sensing the right eye UEb. The image converter 110 may determine a right-eye viewing area corresponding to the right eye UEb on the second sub-display area DA2 by detecting a reference point RPb and a visual area Ab (or viewing angle FOVb) according to a central position and a size of the pupil PUb of the right eye UEb based on the visual sensing data VSD, and generate a second image signal IMG2 by converting a first image signal IMG1 corresponding to the right-eye image.

Operations of the first sub-visual sensor 400a and the second sub-visual sensor 400b are substantially identical or similar to that of the visual sensor 400 described with reference to FIG. 3, and an operation in which the image converter 110 generates the second image signal IMG2 by converting the first image signal IMG1 based on the visual sensing data VSD generated by each of the first sub-visual sensor 400a and the second sub-visual sensor 400b is substantially identical or similar to that in which the image converter 110 described with reference to FIGS. 3 to 6C generates the second image signal IMG2 by converting the first image signal IMG1 based on the visual sensing data VSD generated by the visual sensor 400. Therefore, overlapping descriptions will not be repeated.

In the display device and the method of driving the same in accordance with the present disclosure, visual information is extracted by analyzing visual sensing data generated by sensing eyes of a user, and the luminance of an area which is not visually recognized to the user (or is recognized relatively little by the user) in a display area is controlled corresponding to the visual information. Accordingly, power consumption can be minimized while not deteriorating the visibility of the user.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
    a visual sensor configured to generate visual sensing data by sensing an eye of a user;
    a display panel including a display area and pixels disposed on the display area;
    an image converter configured to generate a second image signal by converting a first image signal of the pixels based on the visual sensing data; and
    a data driver configured to provide the pixels with data signals corresponding to the second image signal,
    wherein the image converter generates visual information based on the visual sensing data, determines a viewing area which is visually recognized by the user and a non-viewing area other than the viewing area based on the visual information, and generates the second image signal by converting grayscales of the non-viewing area and not converting grayscales of the viewing area in the first image signal,
    wherein the image converter includes:
    a visual analyzer configured to generate first visual information corresponding to a line of sight of the user and second visual information corresponding to a viewing angle of the user based on the visual sensing data, the line of sight of the user being an extension line along a normal direction from a center of a pupil of the eye of the user in the visual sensing data; and
    an area extractor configured to detect a size of a visual area corresponding to the viewing angle of the user based on the second visual information and generate area data corresponding to the size of the visual area,
    wherein the size of the visual area is detected using a distance between the display area and a certain point at a retina of the eye of the user in which an image is focused, and the viewing angle of the user estimated from a size of the pupil of the eye of the user,
    wherein the visual sensor generates the visual sensing data in each of a first frame and a second frame consecutive to the first frame when at least one of a change in size of the pupil of the user or a change in position of the pupil of the user is sensed, and generates the visual sensing data and provide the generated visual sensing data to the image converter in the first frame and does not provide the visual sensing data to the image converter in the second frame when neither of the change in size of the pupil of the user nor the change in position of the pupil of the user is sensed, and
    wherein the image converter generates the second image signal corresponding to the first frame based on the visual sensing data generated in the first frame and generates the second image signal corresponding to the second frame based on the visual sensing data generated in one of the first and second frames.

2. The display device of claim 1, wherein the image converter decreases the grayscales of the non-viewing area.

3. The display device of claim 2, wherein the image converter converts the grayscales of the non-viewing area into grayscale 0.

4. The display device of claim 1, wherein the image converter further includes:
    a reference point extractor configured to determine a reference point corresponding to the line of sight of the user on the display area based on the first visual information and generate reference point data corresponding to the reference point;

an area extractor configured to detect a size of a visual area corresponding to the viewing angle of the user based on the second visual information and generate area data corresponding to the size of the visual area; and a viewing area determiner configured to determine the viewing area and the non-viewing area based on the reference point data and the area data, and generate visible area data corresponding to the viewing area and the non-viewing area.

5. The display device of claim 4, wherein the visual analyzer generates the first visual information from a position of a pupil of the eye of the user, and generates the second visual information from a size of the pupil of the eye of the user based on the visual sensing data.

6. The display device of claim 4, wherein the reference point extractor determines a point at which an extension line corresponding to the line of sight of the user and the display area meet each other as the reference point.

7. The display device of claim 4, wherein the area extractor detects the size of the visual area based on a distance between the display area and a certain point at a retina of the eye of the user in which an image is focused and the viewing angle of the user.

8. The display device of claim 7, further comprising a distance measuring sensor configured to measure the distance between the display area and the retina.

9. The display device of claim 7, wherein the distance between the display area and the retina has a predetermined value.

10. The display device of claim 4, wherein the viewing area determiner determines an area having a size equal to that of the visual area and including the reference point as a center of the area as the viewing area, and determines an area except the viewing area as the non-viewing area.

11. The display device of claim 4, wherein the image converter further includes a grayscale converter configure to specify pixels corresponding to the non-viewing area among the pixels based on the visible area data received from the viewing area determiner and generate the second image signal by converting grayscales of the pixels corresponding to the non-viewing area in the first image signal.

12. The display device of claim 1, wherein the visual sensor generates the visual sensing data in each of a first frame and a second frame consecutive to the first frame, and
wherein the image converter generates the second image signal corresponding to the first frame based on the visual sensing data generated in the first frame and generates the second image signal corresponding to the second frame based on the visual sensing data generated in the second frame.

13. The display device of claim 1, wherein the visual sensor generates the visual sensing data in a first frame, and
wherein the image converter generates the second image signal corresponding to the first frame and the second image signal corresponding to a second frame consecutive to the first frame.

14. The display device of claim 1, wherein the visual sensor includes a camera configured to acquire an image corresponding to the eye of the user by photographing the eye of the user.

15. A method of driving a display device including a display area and pixels disposed on the display area, the method comprising:
generating visual sensing data by sensing an eye of a user;
generating visual information based on the visual sensing data;

determining a viewing area which is visually recognized by the user and a non-viewing area other than the viewing area based on the visual information;
specifying pixels corresponding to the non-viewing area among the pixels;
generating a second image signal by converting grayscales of the pixels corresponding to the non-viewing area and not converting grayscales of the pixels corresponding to the viewing area in a first image signal of the pixels by an image converter; and
providing the pixels with data signals corresponding to the second image signal,
wherein the generating of the visual information includes:
generating first visual information corresponding to a line of sight of the user and second visual information corresponding to a viewing angle of the user based on the visual sensing data, the line of sight of the user being an extension line along a normal direction from a center of a pupil of the eye of the user in the visual sensing data,
wherein the determining of the viewing area and the non-viewing area includes:
determining a size of a visual area corresponding to the viewing angle of the user based on the second visual information,
wherein the size of the visual area is detected using a distance between the display area and a certain point at a retina of the eye of the user in which an image is focused, and the viewing angle of the user estimated from a size of the pupil,
wherein, in the generating of the visual sensing data, the visual sensing data is generated in each of a first frame and a second frame consecutive to the first frame when at least one of a change in size of the pupil of the user or a change in position of the pupil of the user is sensed, and the second image signal corresponding to the first frame is generated based on the visual sensing data generated in the first frame and the second image signal corresponding to the second frame is generated based on the visual sensing data generated in the second frame, and
wherein, in the generating of the visual sensing data, the visual sensing data is generated and provided to the image converter in the first frame and is not provided to the image converter in the second frame when neither of the change in size of the pupil of the user nor the change in position of the pupil of the user is sensed, and the image converter generates the second image signal corresponding to the first frame based on the visual sensing data generated in the first frame and generates the second image signal corresponding to the second frame based on the visual sensing data generated in one of the first and second frames.

16. The method of claim 15, wherein, in the generating of the second image signal, the grayscales of the pixels corresponding to the non-viewing area are decreased.

17. The method of claim 16, wherein, in the generating of the second image signal, the grayscales of the pixels corresponding to the non-viewing area are converted into grayscale 0.

18. The method of claim 15, wherein the determining of the viewing area and the non-viewing area includes:
determining a reference point corresponding to the line of sight of the user based on the first visual information; and determining a size of a visual area corresponding to the viewing angle of the user based on the second visual information.

19. The method of claim 18, wherein the determining of the viewing area and the non-viewing area further includes:
determining an area having a size equal to that of the visual area and including the reference point as a center of the area as the viewing area; and
determining an area except the viewing area as the non-viewing area.

* * * * *